United States Patent [19]

Howlett

[11] Patent Number: 5,042,611
[45] Date of Patent: Aug. 27, 1991

[54] METHOD AND APPARATUS FOR CROSS-WELL SEISMIC SURVEYING

[75] Inventor: Donald L. Howlett, Kingwood, Tex.

[73] Assignee: Texaco Inc., White Plains, N.Y.

[21] Appl. No.: 526,201

[22] Filed: May 18, 1990

[51] Int. Cl.$^5$ .............................................. G01V 1/40
[52] U.S. Cl. ................................... 181/104; 181/102; 367/25; 367/911
[58] Field of Search ................... 367/57, 160, 161, 25, 367/911; 181/102, 104, 106, 113, 111; 310/330, 331, 332, 329, 337

[56] References Cited

U.S. PATENT DOCUMENTS

| 2,638,556 | 5/1953 | Hausz | 310/329 |
| 2,728,868 | 12/1955 | Peterson | 310/229 |
| 2,992,694 | 7/1961 | Musgrave et al. | 367/57 |
| 3,287,692 | 11/1966 | Turner | 367/161 |
| 4,214,226 | 7/1980 | Narasimhan et al. | 367/57 |
| 4,298,967 | 11/1981 | Hawkins | 367/57 |
| 4,415,998 | 11/1983 | Blizard | 367/25 |
| 4,606,014 | 8/1986 | Winbow et al. | 367/75 |
| 4,651,688 | 6/1988 | Paulsson | 367/57 |
| 4,782,910 | 11/1988 | Sims | 367/160 |
| 4,783,771 | 11/1988 | Paulsson | 367/57 |
| 4,856,614 | 8/1989 | Areus et al. | 181/111 |
| 4,899,844 | 2/1990 | Katahara et al. | 181/106 |

FOREIGN PATENT DOCUMENTS

| 224350 | 6/1987 | European Pat. Off. | 181/104 |
| 847866 | 9/1960 | United Kingdom | 310/329 |

OTHER PUBLICATIONS

"Bender Bar Transducers for Low Frequency . . .", Sheridan et al., 97th Meeting of Acoust. Soc. of America, Mass. Jun. 15, 1979, Honeywell.

Primary Examiner—Ian J. Lobo
Attorney, Agent, or Firm—Jack H. Park; Kenneth R. Priem; Russell J. Egan

[57] ABSTRACT

A method and apparatus for inter-well seismic logging include a seismic source capable of being lowered into a first or surce well and a plurality of receiving and/or detecting means capable of being lowered to at least one second or receiving well. Signals generated from the seismic source pass through the earth and are received by the respective receivers. The recorded data is subsequently computer processed to form a profile which represents the geological configuration between the wells. The seismic source having at least one bender arm assembly including two sets of piezoelectric ceramic crystals and, preferably, a reaction mass connected intermediate the ends thereafter generate the seismic signals.

4 Claims, 3 Drawing Sheets

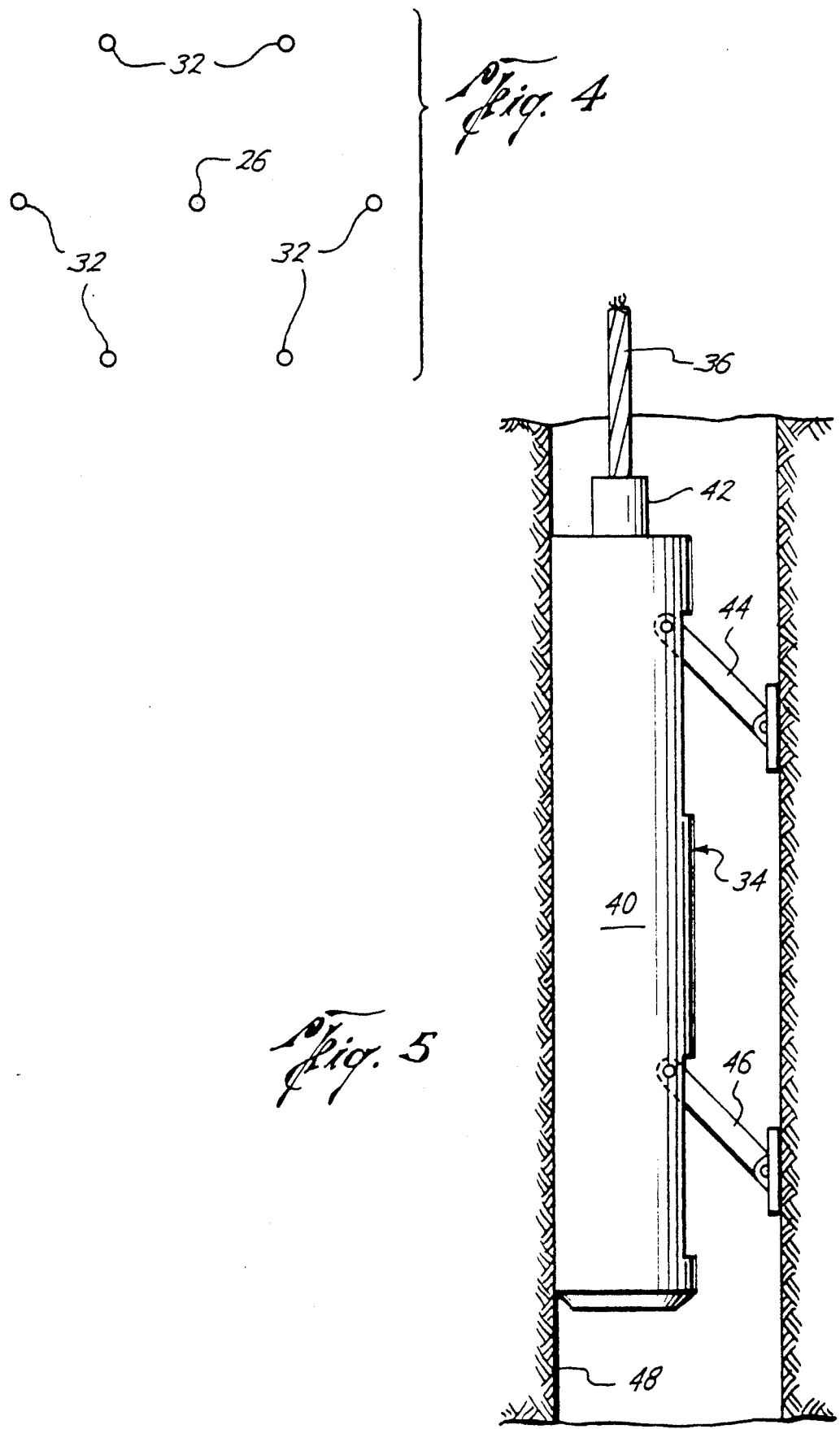

METHOD AND APPARATUS FOR CROSS-WELL SEISMIC SURVEYING

BACKGROUND OF THE INVENTION

1. The Field of the Invention

The present invention pertains to a method and apparatus for effecting cross-well seismic surveys and in particular, to a down-hole seismic source using piezoelectric means and a reaction mass for generating a seismic signal.

2. The Prior Art

There are many well-known methods and apparatus for effecting seismic surveys from the surface of the earth and even from the surface of water. All of these known surveying techniques basically involve a first surface station wherein a seismic signal is generated by an explosion, by a sudden emission of compressed gas or the like, or by the rapid descent of a significant mass against the earth, each providing an essentially single signal, or a mechanical vibrator providing generated signal which continuously sweeps a limited range, and at least one second station, remote from the first station, having at least one listening or receiving device to sense and record the reflected seismic wave which was generated at the first station. The recorded data from the second station is then processed to form a geological profile of the area. All of these known methods and apparatus have found widespread use and are effective to a degree. However, because of the fact that the upper surface layers of the earth have been weathered over the ages, they serve to greatly antennuate high frequency signals generated from the earth's surface. This antennuation is such that when the signal gets to the depths of many oil and gas reserves, it is substantially impossible to obtain any resolution for anomalies less than 100 feet in size. Thus conventional surface seismic surveying can cover very large areas, but with limited resolution.

In the technique known as well-logging, it is possible to get very accurate determination of the subsurface structure, but the devices of this nature are limited as to the distance from the borehole which can be surveyed. It is usually a matter of only inches and when one considers that the wells are drilled generally hundreds of feet, if not hundreds of yards apart, then it becomes quite apparent that this type of seismic surveying would miss large bodies of potential value.

A newly developing technology is known as cross-well seismic surveying and involves placing a seismic source in a primary well and receivers in at least one secondary well in the immediate vicinity of the first well. It has been possible to process the data recorded at the secondary wells to form high resolution images of the entire area between the wells. In cross-well seismic surveying, once both the source and receivers are lowered into the earth, the ability to pass high frequency seismic signals is greatly improved, particularly when the source is clamped to the borehole wall. Cross-well seismic surveying can provide resolution on the order of ten feet.

Since a borehole seismic source and borehole receiver assemblies both operate in the same environment as well-logging tools, they must share many of the same physical characteristics. Thus, each must be capable of being encapsulated, suspended from a cable or wire and lowered into the borehole, which is usually fluid filled, to considerable depths at which extremes of temperature and pressure may be encountered. There is also limited capacity for communication between the downhole tool and the surface as defined by the multi-conductor cable. It may be preferable to have the seismic source controlled by means of a downhole computer having instructions stored in its memory and for the receiver assemblies to have downhole recording capabilities.

At the present time there are few borehole seismic sources which are commercially available. One is a borehole vibrator that operates by hydraulic power supplied from the surface through coiled tubing. This tool is approximately 120 feet long and produces a powerful sine wave signal in the borehole fluid, which signal varies in frequency from 20 to 120 hertz. Another borehole seismic source is an air gun that is essentially the same as the well-known marine air gun. It is powered by compressed air supplied from the surface through a special umbilical cable containing a rubber hose. This device releases a high pressure localized burst of air into the borehole fluid.

The present invention is distinct from these previously known mechanical devices in that it is electronic in nature. The present invention incorporates at lease one piezoelectric bender bar assembly which can be energized from the surface by a high power amplifier. This device, which is somewhat similar to naval sonar transducers, can operate over a standard multi-conductor wire line cable. The bender bar assembly, as an example, can be constructed from sets of ceramic piezoelectric crystals bonded to the two sides of a thin metal plate to form an assembly, typically about 3 inches wide and 24 inches long. Both sets of crystals are energized simultaneously, by applying a high voltage with opposite polarity, causing one crystal to expand while the other contracts. This results in the assembly, since both ends of the bar are fixedly clamped, bending in the middle portion. Although there are several resonant points, the bender bar motion generally follows the applied electrical signal wave form.

When a piezoelectric crystal bender bar assembly is used as a borehole seismic source, the assembly is preferably enclosed in a oil filled flexible tube. Pressure waves generated by bender bar motion couple through the flexible tube and through the borehole fluid. Some of the energy is coupled from the borehole fluid through the metal well casing into the earth. The seismic signal radiating from the borehole is a horizontally traveling pressure or P wave. Although it is not well understood, the radiation pattern in earth is believed to be nomi1ally symmetrical about the well bore axis.

The seismic wave generated by the subject invention will have pressure (P) and shear (S) wave components. The P wave will arrive at the receiver first as the S wave travels at only about half the velocity of a P wave. The S wave is affected only by rock structure and not by liquid contact while the P wave is affected by liquid contact. The ratio of the P wave to the S wave can be used to estimate porosity of the rock through which the waves pass.

It has been reported that conventional devices have been able to transmit seismic signals of up to 3,000 hertz through limestone between cased wells 1,500 feet apart.

With any seismic source that couples energy to the earth by pressurizing the borehole fluid, most of the energy (90 to 95%) remains trapped inside the borehole fluid in the form of tube waves, which are pressure waves that travel vertically up and down the length of the fluid filled casing. Not only is this inefficient, but the tube wave is a major cause of unwanted signals in the form of background noise. The tube waves are strongly reflected from the bottom of the hole and from the top of the fluid level and to a lesser extent from any anomaly in the casing. Each of these points causes a fraction of the tube wave energy to be transmitted into the earth and that effectively becomes another seismic source point.

SUMMARY OF THE INVENTION

The present invention overcomes many of the above-discussed difficulties by providing a vibrating seismic source that produces a superior seismic signal in the earth and greatly reduces tube wave generation so that it will operate either in air or liquid filled holes suspended from an industry standard multi-conductor wire line cable. The subject seismic source has at least one bender bar assembly which is enclosed inside a fluid tight steel housing similar to that used in well-logging tools. The ends of the bender bar assembly are firmly attached to the inside of the housing and the tool is provided with means, such as extendable arms, pistons or electromagnets, to firmly attach the tool housing or sonde to the well bore casing or wall. A reaction mass is preferably coupled to the center of the bender bar assembly so that the inertia of the reaction mass will resist any motion of the bender bar assembly. The forces generated will be transmitted through the tool housing to the well borewall and to the earth. At least one receiver lowered into a second well receives and records the seismic signal for subsequent analyzation.

BRIEF DESCRIPTION OF THE DRAWINGS

FIG. 4 is a plan view of the boreholes in a typical field;

FIG. 5 is a side elevation of the present invention positioned in a well bore;

DETAILED DESCRIPTION OF THE PREFERRED EMBODIMENT

Figure 1:
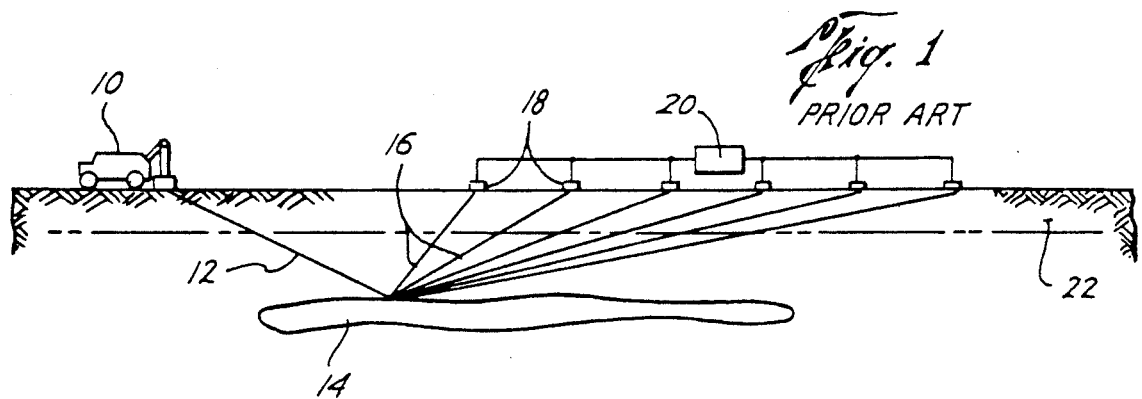
FIG. 1 is a diagrammatic view of a typical prior art surface seismic survey arrangement.

A typical surface seismic survey setup is shown in FIG. 1 with a seismic source 10 generating a signal 12 which is reflected off subsurface anomaly 14 with reflected waves 16 being picked up by an array of listening devices or sensors 18 each connected to recording means 20. While this method has generally been used to an acceptable degree, it has several major problems. One problem is the uppermost strata, noted here as 22, is a layer which is highly broken up by weathering so that it becomes an antennuator for the higher frequency seismic signals generated by source 10. It also is inherent in this type of survey that anomalies of less than 100 feet in size generally cannot be detected.

Figure 2:
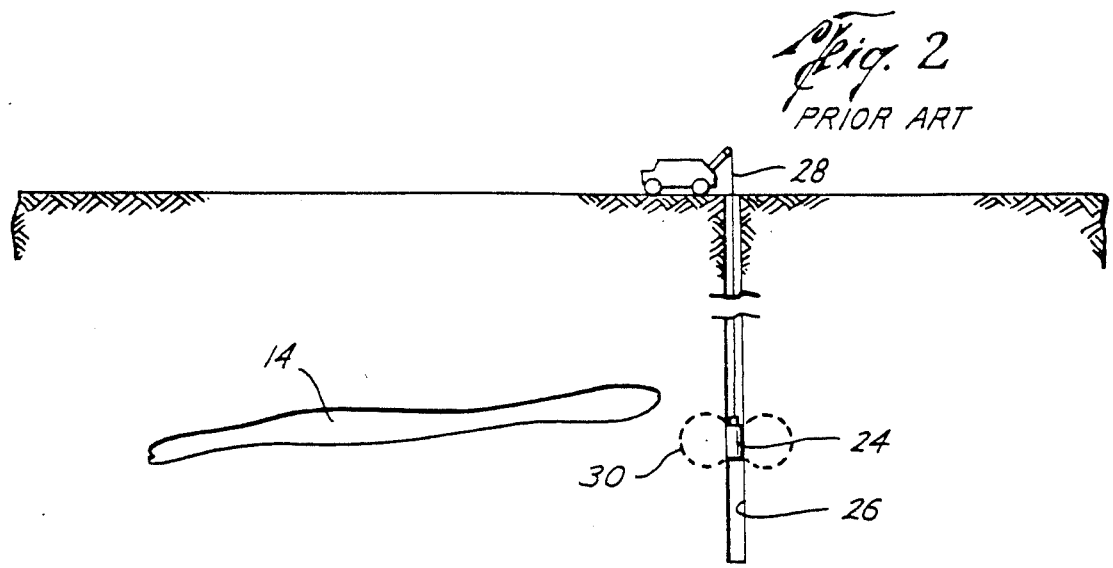
FIG. 2 is a diagrammatic view of a typical prior art well bore logging arrangement.

FIG. 2 is a typical well-logging arrangement in which a well-logging device or sonde 24 is lowered into a well bore 26 on a multi-conductor wire line 28. This type of tool uses any one of a number of different methods to examine the structure of the earth through which the well bore passes. The major problem with this arrangement is that typical well-logging tools 24 only can detect limited distances from the well bore, generally a matter of inches or feet at the most as indicated by broken lines 30, thus leaving large areas between adjacent wells unsurveyed, except for the previously discussed surface seismic surveys. The anomaly 14 would not even be detected by well logging in this instance.

Figure 3:
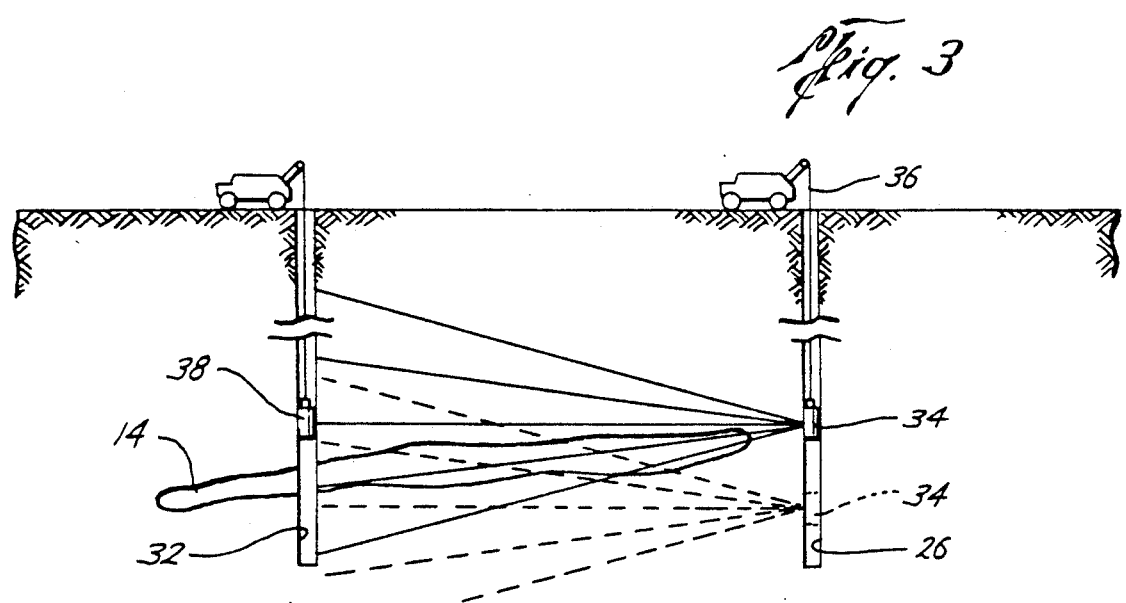
FIG. 3 is a diagrammatic view of the present invention.

FIGS. 3 and 4 illustrate the present invention as it would be utilized in a typical field. The field has a plurality of boreholes 26, 32 already drilled. Borehole 26 will be designated as the primary or source borehole with the remaining boreholes 32 being designated as the secondary or sensing boreholes. The seismic source 34 is lowered on a wire line 36 in the source well 26 to a first depth and fixed against the side of the borehole. At least one receiving sensor 38 is then lowered into each receiving well 32 to a first specified depth and the seismic surveying is commenced. After each survey, the depth of sensor 38 is changed and another survey run. The process is then repeated with the source 34 at a different depth and the receivers 38 run through the same sequence of depths. It should be noted, for example from FIG. 4, that the choice of source and secondary wells is not critical to the operation of the present invention, but is of importance regarding the area to be surveyed.

Figure 6:
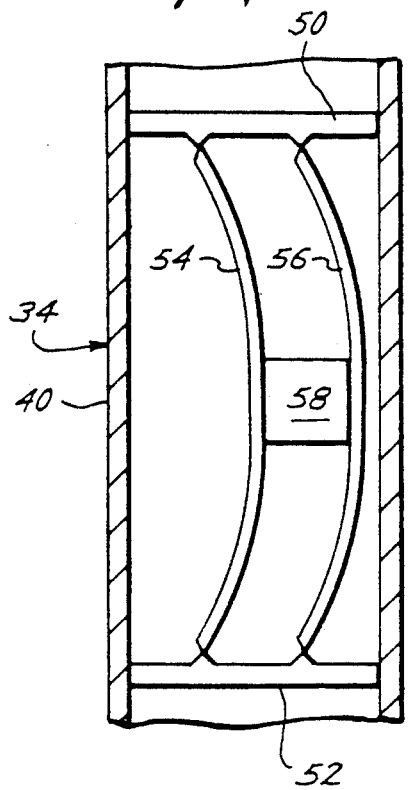
FIG. 6 is a vertical section through an embodiment of the tool of the present invention.

The seismic source generator 34, according to the present invention, is shown in greater detail in FIGS. 5 and 6. The generator 34 has an elongated generally cylindrical housing 40 which is typical of borehole tools or sondes and is attached at one end by connector 42 to a conventional multiple conductor wire line cable 36 providing both support of the tool and electrical communications between the surface. External to the housing 40 are means 44, 46 to bring the tool housing 40 into a tight abutting condition with a side wall 48 of the borehole or casing (not shown). This clamping of the tool can be accomplished by any one of a number of well-known means, such as the illustrated extendable arms 4 or legs 44, 46. Electromechanical, electromagnetic, pneumatic or hydraulic devices are available which could be used to actuate the arms or legs, illustrated, or other clamping means not shown, without departing from the spirit or essential characteristics of the invention. Suitable anchoring means are shown in U.S. Pat. No. 4,757,873, the disclosure of which is incorporated herein by reference.

Figure 7:
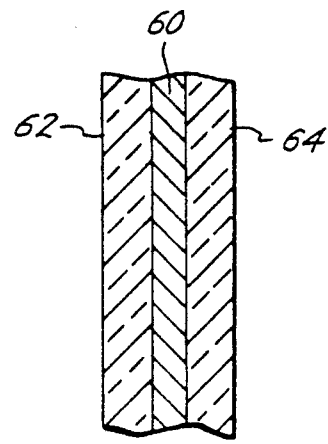
FIG. 7 is an enlarged detail longitudinal section through an embodiment of a bender bar according to the present invention.

Turning now to FIG. 6, the seismic source 34 is shown in a vertical section through the housing 40 and has a pair of parallel spaced transverse brace members 50, 52. A pair of bender bar assemblies 54, 56 are firmly attached by their respective ends to the cross members 50, 52 and a reaction mass 58 is coupled towards the center of and between the bender bar assemblies 54, 56. A detailed section through a representative bender bar assembly is shown in FIG. 7. Each bender bar assembly preferably is a laminate formed by a thin metal plate 60 of approximately 3 inches wide by 24 inches long with ceramic piezoelectric crystals 62, 64 bonded to the opposite sides of the metal plate 50. The reaction mass 58 has been shown as a block for the sake of convenience. The reaction mass could be a heavy or dense liquid, such as mercury, surrounding the bender bar assemblies 54, 56 or in a sealed resilient container (not shown) between the bars. While a pair of bender bar assemblies have been shown, it should be noted that a single bender bar assembly would also work.

No receiver assembly 38 (FIG. 3) has been shown in detail since suitable devices are commercially available. For example, the Haliburton Geophysical Systems SWC30 receiver has three geophones arranged in a housing with two of the geophones directed for horizontal reception and one geophase directed for vertical reception. As an alternative to geophones, accelerometers which can be clamped to the borehole wall, in the manner of the subject seismic source, would also be acceptable. It would also be possible to use hydrophones for the receiver. One or more hydrophones would be suspended in fluid in the secondary wells and would be sensitive to tube waves. They are omnidirectional in nature but can distinguish between pressure and shear waves by their time of arrival, since shear waves travel at about half the velocity of pressure waves.

Figure 8:
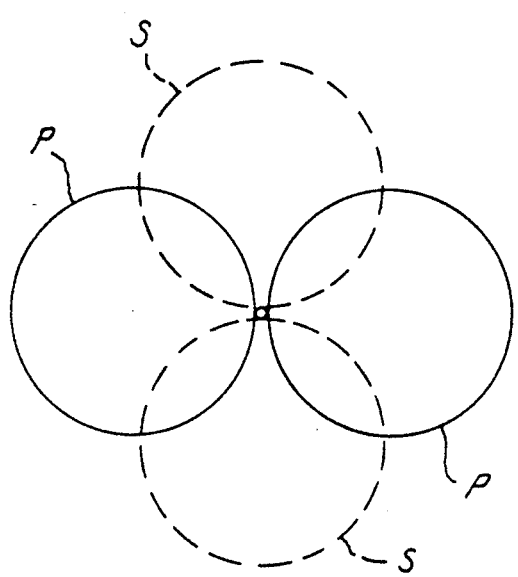
FIG. 8 is a diagrammatic plan view of the seismic wave pattern generated by the present invention.

In operation the seismic source 34 is lowered to the desired depth in the source well 26 and clamped in place against the borehole wall. Then the source (not shown) is energized causing the bender bar assembly to flex. The inertia of the reaction mass 58, will resist any motion of the bender bars 54, 56. The forces developed by this motion will be transmitted through the tool housing 40 (and the well casing not shown) into the earth. The resulting seismic wave is a pressure wave (P) traveling horizontally (in opposite directions) along the axis of the bender bar deflection. A horizontally polarized shear wave (S) will travel horizontally in directions perpendicular to the P wave, as diagrammatically illustrated in FIG. 8, in which the P waves are shown in solid lines and the S waves shown in broken lines. It is assumed that the bender bars are moving left and right in the plan of the paper for this figure.

The present invention should have no difficulty in operating in either liquid-filled or dry boreholes, as long as the source and receivers are capable of withstanding the temperature and pressure conditions encountered. The present invention should not create much of a tube wave, even when the borehole is liquid filled, because the source is clamped to the casing. The noise created by the tube wave has been a problem in some prior art devices.

It should further be possible to pulse the subject seismic source in a coded fashion along the lines taught by U.S. patent application Ser. No. 07/409,907, filed Sept. 20, 1989, titled Coding Seismic Sources and assigned to the common assignee, the disclosure which is incorporated herein by reference. Pulsing of the subject source would require the use of a sweep-type signal, similar to that used in vibroseis, due to the low output energy of the bender bar assemblies. There are many variations of these signals but all use as the central property that of a low power signal continuously applied over a relatively long period of time. The receiver signal is cross correlated with the sweep to produce the effect of collapsing the energy into a single pulse. Note that the sweeps with an excellent auto-correlation can be formed by either a coded sequence of pulses or by continuous functions.

One of the major problems with acquiring borehole seismic data is that the receivers must be repositioned at many different depths in the secondary well. Productivity could be increased by simultaneously deploying many receivers from the same wireline. One of the practical problems in doing this is transmitting the large quantity data to the surface through the standard seven conductor wireline. Another problem is the quantity of electronic hardware required to be in a hostile environment. However, neither of these problems is insurmountable as both are overcome in commercially available well logging tools.

The "sign bit" method which has been used for surface seismic data would be an acceptable approach for recording borehole data generated by the present invention. The current processing technique for cross well seismic data primarily uses only the first arrival time pics of the P wave and S wave. Unlike with surface seismic data, the full wave field is not presently used. This makes the sign bit technique even more appropriate for borehole data than for surface data. Borehole seismic data is often contaminated with random noise from nearby producing operations. This type of problem is better handled by the sign bit technique than by full precision systems.

While most seismic systems digitize the analog seismic signal to great precision with instantaneous floating point amplifiers and 16 bit analog to digital converters, the sign bit method measures the signal to only one bit (sign bit) accuracy. This results in a substantial reduction in the amount of electronics required and in the number of bits to be transmitted.

The sign bit method is not useful when using a powerful impulse source with a high signal to noise ratio, such as dynamite. The sign bit technique is only used with vibroseis type sources where the relatively low source energy is spread out over a long period of time and the signal to noise ratio is low (before correlation). The signal to noise ratio and the number of bits of resolution improves dramatically after correlation.

It can be demonstrated that, if the signal to noise ratio is less than 1 (before correlation), then the sign bit technique is comparable to the full precision systems. As the signal to noise ratio improves above 1, then there is an advantage to increasing the number of bits of precision. The sign bit method works very well in dealing with random noise. It is often superior to full precision systems in the presence of high amplitude transient bursts typical of cultural noise. It does not work well with high coherent noise.

Figure 9:
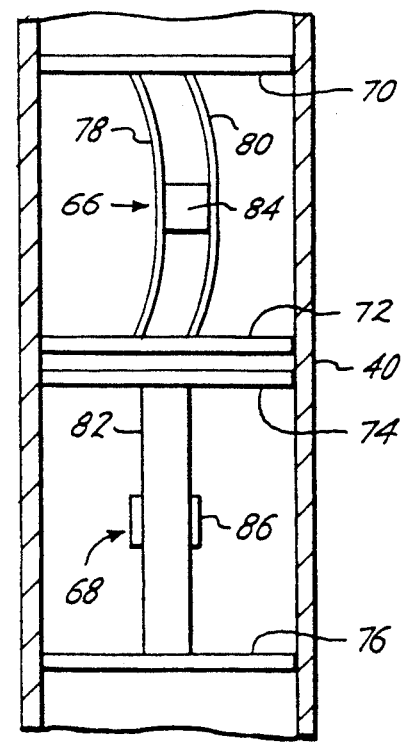
FIG. 9 is a vertical section through an alternate embodiment of the present invention.

As an alternative to the present invention, it is advantageous to be able to produce either pressure waves or shear waves in any given direction. This could be accomplished by using two independent seismic source assemblies according to the present invention, turned at right angles to each other and mounted as close as practical in the same housing. An example of this is shown in FIG. 9 with source assemblies 66, 68 closely stacked in housing 40. Each source assembly would be powered from its own power source (not shown), having mounting means 70, 72, 74, 76, at least one bender arm assembly 78, 80, 82 and a reaction mass 84, 86. By properly shifting the relative phases of the signals applied to the two assemblies, it should be possible to effectively rotate the direction of the radiated waves around the well bore axis. Determining the direction of the wave generated by the subject seismic source can be accomplished by incorporating any of the known sonde orientation devices into the housing of the present invention.

As a further alternative, the use of coded sweep signals will allow the simultaneous use of multiple borehole sources in a non-interfering manner. This would greatly increase the rate of data acquisition and reduce the cost. There is no theoretical limit to the number of coded sources that could be operated simultaneously yet independently.

As a still further alternative to the present invention, a series of spaced apart listening or receiving devices could be lowered into each receiving well thereby reducing the number of signals which must be generated from the source.

The device described is small, lightweight and has very few moving parts which should make it very practical and capable of withstanding the rough treatment it might be expected to encounter in the field.

The present invention may be subject to many variations and changes without departing from the spirit or essential characteristics thereof. The present specification and drawings should therefore be considered in all respects as being illustrative and not restrictive of the scope of the invention.

What is claimed:

1. An apparatus for generating readily detectable seismic waves, comprising:
   a housing capable of being lowered into a well borehole on a wireline, said housing defining a sealed enclosure;
   means for clamping said housing against a wall of said borehole;
   support means fixedly mounted in said enclosure;
   at least first and second bender arm assemblies mounted on said supported means, each bender arm assembly having a pair of parallel spaced arm members and a mass attached to said arms intermediate their ends, each said arm member being formed by at least a pair of piezoelectric ceramic crystals, said first and second bender arm assemblies being mounted in said housing such that the linear motion of their respective masses is substantially at right angles to each other;
   first and second separate drive means each connected respectfully to said first and said second bender arm assemblies; and
   means to control said first and said second drive means to energize said crystals with specific phase relationship and sequencing so that said bender arm assemblies are actuated to generate a seismic wave which is both coded in output and directed in orientation thereby making it readily distinguishable from other signals and noise.

2. An apparatus according to claim 1 wherein said support means are parallel, spaced members fixed in said housing with said bender arm assemblies mounted therebetween.

3. An apparatus according to claim 1 wherein each said bender arm assembly comprises:
   an elongated thin member; and
   a pair of piezoelectric ceramic crystals bonded to opposite sides of said member, alternate energization of said crystals causes said arm to bend generating seismic waves.

4. An apparatus according to claim 1 wherein said mass is a fluid filled container.

* * * * *